United States Patent [19]

Herwig et al.

[11] Patent Number: 5,528,010
[45] Date of Patent: Jun. 18, 1996

[54] METHOD AND APPARATUS FOR INITIATING ELECTRIC ARC SPRAYING

[75] Inventors: Warren E. Herwig, Oshkosh; John Vollrath, Appleton, both of Wis.

[73] Assignee: The Miller Group, Ltd., Appleton, Wis.

[21] Appl. No.: 246,794

[22] Filed: May 20, 1994

[51] Int. Cl.$^6$ .................................................. B23K 10/00
[52] U.S. Cl. ........................ 219/76.16; 219/121.47; 219/121.54; 219/121.57; 219/137.71; 427/446
[58] Field of Search .................. 219/121.54, 121.57, 219/121.47, 76.14, 76.15, 76.16, 137.7, 137.71; 427/508, 535, 460, 569, 446

[56] References Cited

U.S. PATENT DOCUMENTS

| | | |
|---|---|---|
| 3,896,287 | 7/1975 | Cook . |
| 3,912,980 | 10/1975 | Crump et al. . |
| 4,088,866 | 5/1978 | Lund et al. ...................... 219/137 R |
| 4,300,035 | 11/1981 | Johansson . |
| 4,300,036 | 11/1981 | Johansson . |
| 4,319,124 | 3/1982 | Johansson . |
| 4,467,176 | 8/1984 | Mizuno et al. .................. 219/121.71 |
| 4,492,337 | 1/1985 | Harrington et al. . |
| 4,512,513 | 4/1985 | Rogers ................................ 239/8 |
| 4,518,625 | 5/1985 | Westfall ............................ 427/37 |
| 4,624,410 | 11/1986 | Rogers . |
| 4,628,181 | 12/1986 | Pan et al. . |
| 5,059,765 | 10/1991 | Laing ............................. 219/125.11 |
| 5,168,144 | 12/1992 | Hongu et al. .................. 219/137.71 |
| 5,191,186 | 3/1993 | Crapo, III et al. . |

FOREIGN PATENT DOCUMENTS

| | | | |
|---|---|---|---|
| 5116258 | 7/1974 | Japan .......................... 219/137.71 |
| 0072485 | 4/1987 | Japan .......................... 219/137.71 |

OTHER PUBLICATIONS

Gas Metal Arc Welding, Chapter V—GMAW Variables, Miller Electric Mfg. Co., 1991 (6 pages).

Recommended Practices for Electric Arc Spraying, American Welding Society, Inc., 1978 (pp. 1–6).

*Primary Examiner*—Mark H. Paschall
*Attorney, Agent, or Firm*—Foley & Lardner

[57] ABSTRACT

A method and apparatus for initiating arc spraying is disclosed. The invention includes feeding the wires to an arc at a predetermined rate, for a predetermined length of time. Thereafter the wires are fed at a rate which is controlled in response to the current magnitude. The arc is also monitored and the condition of the arc—whether there is a shortage or outage—is indicated to the user.

19 Claims, 4 Drawing Sheets

METHOD AND APPARATUS FOR INITIATING ELECTRIC ARC SPRAYING

FIELD OF THE INVENTION

This invention relates generally to a method and apparatus for electric arc spraying, and, more particularly, to initiate current and wire feed speed in a metal arc sprayer.

BACKGROUND OF THE INVENTION

Electric arc spraying is a thermal spray process in which one or more wires-of either similar or dissimilar materials are melted, atomized and the molten particles are propelled onto a prepared surface building up a metallic coating. The thermal energy required to melt the wire is produced by an electric arc developed at the wire ends. A high velocity gas stream is used to atomize the molten metal in the arc and propel the fine droplets onto the surface to be coated. Arc spray equipment may be used to apply different types of coatings, for example corrosion protection coating, wear resistant coatings or resurfacing coatings.

An electric arc spray apparatus typically includes five major components: a wire feeder; a high current DC power source; a process controller; a source of high velocity gas; and an electric arc gun. The wire feeder continuously feeds one or more consumable metal wires at a uniform rate of speed. The wire is typically driven by a wire drive unit and then fed through insulated flexible conduits into wire guides and through electrode tips on an electric arc gun. The electrode tips generally guide the wires to an intersecting point where they meet.

Current from the DC power source is provided to the consumable wire at the electrode tips and an arc is formed where the two wires meet. The controller causes the power supply to furnish the correct electrical energy, wire feed speeds and gas flow.

Located directly behind the arc and positioned in a line with the arc is a nozzle through which an atomizing gas flows at high velocity. The atomizing gas is typically compressed air or an inert gas, such as argon or nitrogen. The velocity of the atomizing gas as it leaves the nozzle is typically up to thousands of feet per second and the velocity may be regulated over a broad range. The atomizing gas velocity has major effects on the characteristics of the coating.

The temperature of the arc may be up to the tens of thousands of degrees Fahrenheit. Because of these temperatures the particles when accelerated, impact and bond to the minute protrusions of a properly cleaned and roughened substrate, producing a high coating adhesion to the substrate and strong inner particle cohesive strength. In addition to strong bond strength, other advantages of electric arc spraying are low cost and ease of application relative to flame spraying.

Initially the ionized plasma in the arc is created as the two wires advance to an intersecting point and touch. A high density electric current is applied through the wires, thus creating extreme heat at the wires contact point, melting the touching portions of the metal wires and ionizing the surrounding gas. The ionized materials or plasma provides a relatively low resistance path for the flow of electric current. The high current flowing through the plasma and the voltage drop across the arc provide the necessary sustaining power to maintain the ionized state. The anode wire is heated by electrons which impact thereon after being released from the cathode wire surface. The cathode wire surface is heated by the impacting of positive gas ions.

For a particular application a given voltage, air velocity and current will be desired. In order to obtain the desired voltage the user often adjusts power supply voltage settings. The user also selects an air velocity. The current is usually selected by the user selecting a wire feed speed, because current speed is generally proportional to wire feed over most operating ranges. To assist in selecting the approximate wire feed speed, tables are often provided that give the relationship between wire feed speed and current for particular materials and operating conditions. To fine tune the current magnitude the user adjusts the wire feed speed.

Such prior art controllers generally have open loop control. Some prior art arc spray apparatus include a closed loop drive feeder speed control that monitors drive feeder speed and adjusts the speed of the drive motor to maintain a constant drive feeder speed. However, these controllers do not directly control the current in the arc. Thus, such controllers do not compensate for variations in operating conditions such as changes in the wire diameter, melting point of the wire, variations in the velocity of the air, variations in the alignment of the wire, or irregularities in the stiffness, cast or helix of the wire. Accordingly, a controller that compensates for such factors is desirable and would solve many of the problems of the prior art.

Generally speaking in electric arc spraying, conditions may be characterized by the operating voltage and current and gas flow rate. At certain voltage and current conditions an arc outage is likely to occur. At other voltage and current conditions a wire shortage is likely. At still other conditions the process can be performed smoothly, i.e., neither an arc outage nor a wire shortage is likely to occur. In the arc spraying process wire shortages and arc outages can lower the quality of the coating.

A wire shortage occurs when the wires are pushed too fast and touch, thereby bonding together. The bonded wires create a very low resistance path and current surges. After bonding together the wires travel together and eventually break off, but not necessarily at the tip. The high velocity air blows the end, called a spit, off, thus degrading the coated material. The spitting event is often repeated in a pulsing manner, wherein after the spit occurs, the arc reforms, the wires retouch and the process repeats.

When the arc is extinguished by the gas flow, i.e an arc outage, popping can occur. During an arc outage the wire continues to be fed and the ends remain melted to some extent. The partially melted wires then touch, restarting the arc. This problem may repeat in a pulsing manner in that after the arc is restarted the molten wire is blown away, and the arc is again extinguished.

If the arc spray is smooth (neither shortage nor outages occur) the resulting metal coating is repeatable and of acceptable quality. Spitting, popping and pulsing performance mean the resulting coatings may contain imperfections or not be repeatable, or both. Thus, it is desirable to detect the presence of both outages and shortages. As an electric arc spray operator becomes skilled, he develops both visual and audible perception of the process and develops a sense of when the spray plume is correct (running smooth) or not correct (spitting, popping and pulsing).

The visual and audible effects of the spray process depend on many factors, including the type and size of spray wires, the arc voltage and current and the gas flow rate. Thus, reading, or interpreting the visual and audible characteristics of the spray plume requires training of new operators by experienced operators and can take years to develop. Accordingly, it is desirable that an electric arc spray product detect and indicate the existence of wire shortages or arc outages so that an inexperienced operator may adjust the parameters if necessary, and also learn to recognize the characteristic sounds of these conditions under many varied uses.

To start the arc in an electric arc spray system the two wires are brought together until the metal to metal conduction of electrons begins. Since the touching resistance is low a large current flow through the wires will heat the wire ends until melting of the wire by the wattage produced. When current and voltage conditions are favorable, i.e. in the operating range where neither arc outages nor wire shortages occur, a smooth start of the spraying plasma is accomplished.

However, when the starting current and voltage is at or near wire shorting conditions, explosive starts can result because wire feed speeds are high. Such an initially high feed rate puts large amounts of unmelted wire in the arc area before sufficient heat can be developed. Frequently the leading end of the wires remains unmelted while a further back section will begin to melt and the magnetic field around the wire, due to the very high short current, will constrict this melted section. When the cross section of the melt becomes sufficiently small and its resulting electrical resistance very high, large amounts of wattage are produced very rapidly and an explosion occurs that expels the unmelted wire out of the gun and onto the surface to be coated.

Starting an arc at or near arc outage conditions requires very low wire feed rates (inches per minute, for example). Low feed rates cause the wires to just slightly touch and large amounts of heat to be generated instantaneously. The ends of the wire then burn off and the arc goes out. The whole process then starts over as the new wire ends again approach each other and lightly touch.

For the reasons described above, and to overcome motor inertia and other starting difficulties, starting the arc at or near either wire shortage or arc outage conditions areas is difficult. Accordingly when operation is desired to be at or near these conditions, an arc sprayer which starts the arc under normal operating conditions, and then moves to the difficult operating conditions, is desirable.

SUMMARY OF THE PRESENT INVENTION

According to one aspect of the invention a method of arc spraying a pair of wires includes feeding the wires to an arc at a controllable rate. An electrical current is provided through the wires to the arc. The magnitude of an arc parameter such as current, voltage or power is monitored, and the rate the wires are fed is controlled in response to the magnitude of the parameter.

According to another aspect of the invention an arc sprayer includes a feed motor that drives the wires and a power source that provides current to the wires. A controller is connected to the power source and the feed motor, and includes an arc parameter sensor, such as a current, voltage or power sensor, and a closed loop control circuit. The closed loop control circuit receives the output of the sensor and controls the speed of the feed motor in response to the parameter magnitude.

According to a third aspect of the invention a controller for an arc sprayer includes an arc current sensor that senses the magnitude of a parameter of the arc, such as current, voltage or power, and provides an output indicative of the magnitude. A setpoint selector is also provided and has an output indicative of a setpoint. A comparator compares the magnitude of the parameter to the setpoint and an error signal generator controls the wire feed motor in response to the comparison.

According to yet another aspect of the invention a method and apparatus for arc spraying includes feeding the wires to an arc at a controllable rate and providing power to the arc. The arc is monitored and the condition of the arc—whether there is a shortage or outage—is indicated to the user.

Another aspect of the invention is a method of arc spraying by initially feeding the wires to an arc at a predetermined rate for a predetermined length of time. The wires are subsequently then fed to the arc at different rates after the predetermined length of time has passed.

Other principal features and advantages of the invention will become apparent to those skilled in the art upon review of the following drawings, the detailed description and the appended claims.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENT

The present invention relates to electric arc spraying and includes a method and apparatus for electric arc spraying. According to one aspect of the invention, shown in FIG. 1, electric arc sprayer 100 includes a closed loop current control. In accordance with this aspect of the invention, the wire feed speed of the electric arc sprayer 100 is controlled in response to the magnitude of the current in the electric arc and the spray wires.

Figure 1:
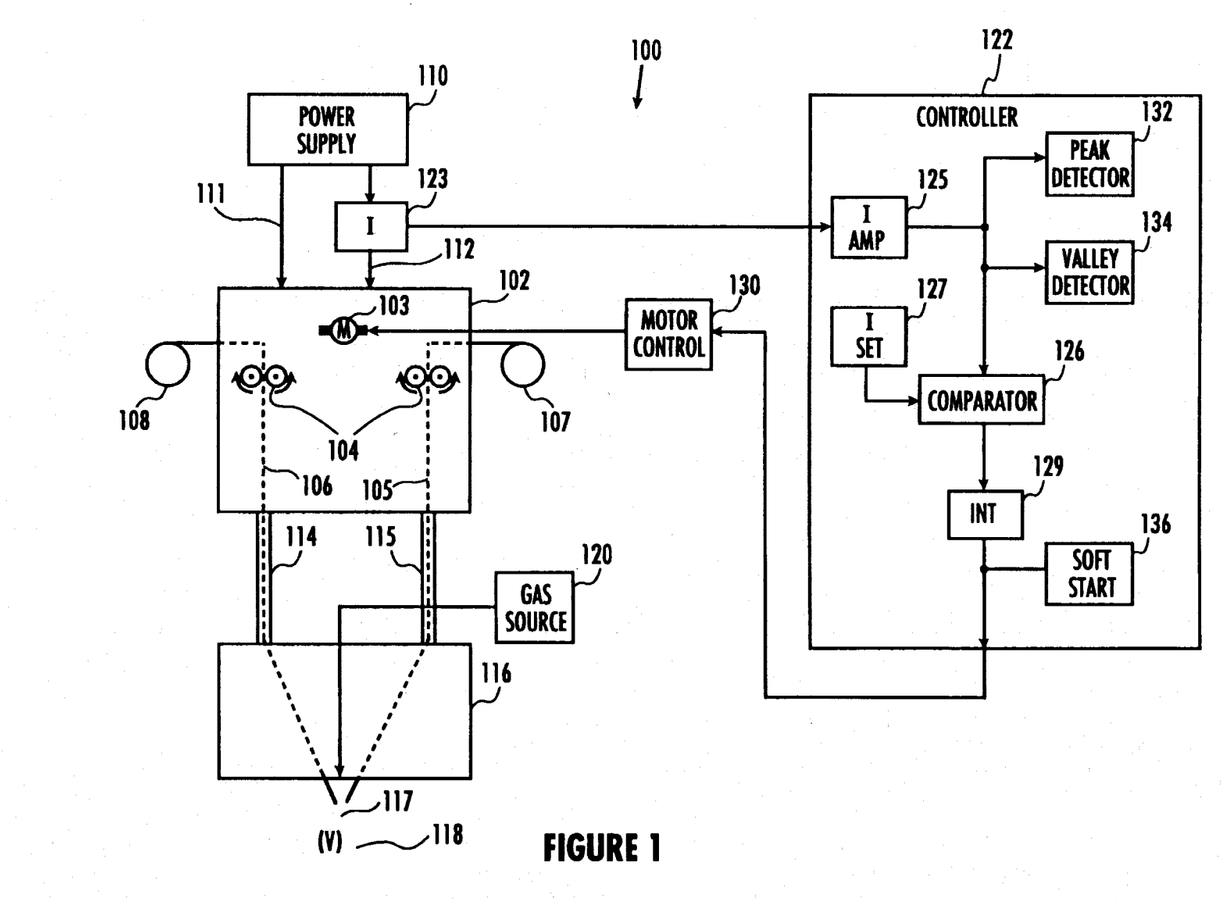
FIG. 1 is a block diagram of an arc sprayer constructed in accordance with the present invention.

As shown in FIG. 1, electric arc sprayer 100 includes a wire feeder 102. Wire feeder 102 includes a motor 103 which drives a pair of wire drive rolls 104. Motor 103 may be any type of motor, for example a DC electric motor, an air motor, or an AC motor. Drive rolls 104 drive a pair of wires 105 and 106 which are consumed in the arc spraying process and deposited on the substrate to be coated. Wires 105 and 106 are driven from a pair of wire spools 107 and 108.

Also shown in FIG. 1 as part of electric arc sprayer 100 is a DC power supply 110. The DC power supply 110 provides an arc current through a pair of conductors 111 and 112. Power supply 110 is typically a selectable constant voltage DC power supply and may be a single- or three-phase rectified supply, or any other type of power supply. Power is provided from power supply 110 on conductors 111 and 112 to wire feeder 102. Conductors within wire feeder 102 provide the arc current therethrough to conductors disposed within a pair of conduits 114 and 115. The conductors in conduits 114 and 115 are hollow and the spray wires pass through the hollow center. Both the current carrying wires and the spray wires 105 and 106 are provided to a spray gun 116. Within the spray gun 116 electrical contact is made from the current carrying wires to the spray wires 105 and 106. In the preferred embodiment, contact is made within the spray gun 116 because arc spray wires 105 and 106 have a much higher resistance than conduits 114 and 115. Spray gun 116 is typically activated by pulling a trigger, although activation may be accomplished by other means. At the tip of spray gun 116 an electric arc 117 is formed.

A source of high velocity gas 120 is also shown in FIG. 1, and the gas therefrom is provided to spray gun 116. The high velocity gas is directed through spray gun 116 to arc 117, thereby creating a plasma plume 118. Gas source 120 may provide air, argon, nitrogen or any other gas, and often provides the gas at a controlled velocity.

As described in the Background of the Invention, an electric arc sprayer works by providing electric current as the spray wires 105 and 106 are being fed. The plasma plume causes the tips of spray wires 105 and 106 to melt and the high velocity gas from gas source 120 atomizes the molten metal and sprays it on the surface of a substrate to be treated.

A controller 122 provides closed loop current control. Controller 122 receives a signal from a current sensor 123 indicative of the magnitude of the arc current. The current sensor 123 is disposed in the arc current path and thus measures the actual arc current. The current sensor 123 can be a shunt, a Hall effect pick-up, a current transformer, or any other current measuring device. In alternative embodiments the closed loop control is based on other parameters of the arc, such as voltage or power.

The current signal is provided to a current amplifier 125 within controller 122. Current amplifier 125 outputs a signal which has a magnitude responsive to the actual arc current. As will be described in greater detail below, current amplifier 125 also dampens or filters the noise on the current signal. The output of current amplifier 125 is provided to a comparator 126 which also receives an input from an operator selected current setpoint 127 output. Comparator 126 compares the magnitude of the actual current (from current amplifier 125) and the current setpoint (from current setpoint selector 127) and provides an output of logic 1 or logic 0, depending upon which input is greater. The logic signal is provided to an integrator 129, which time integrates the dynamic string of logic "1's" and logic "0's." Integrator 129 functions to increase its output when the actual current is less than the current setpoint, and it decreases its output when the actual current is greater than the current setpoint. The output of integrator 129 is provided as an output of controller 122.

The output of controller 122 is provided to a motor controller 130. Motor controller 130 receives the integrated output signal from controller 122 and provides, in response, power to motor 103. The speed of motor 103 is responsive to the amount of power (magnitude of the signal) provided by motor controller 130. Thus, the speed is also responsive to the integrated output of controller 122.

As the wire feed speed increases, the current magnitude increases and as the wire feed speed decreases, the current magnitude decreases. Changes in the current magnitude are sensed by current sensor 123 and amplified by the current amplifier 125. The changing logic states of the comparator 126 is then time integrated to develop the ever changing output of integrator 129. The output of integrator 129 is the output of the controller 122. The controller 122 output is applied to the motor controller 130, which determines the speed of the drive motor 103 and the speed of the arc spray wires 105 and 106. Thus, this embodiment of the present invention provides closed loop control wherein the wire feed speed is adjusted in response to the actual arc current in such a manner that arc current is maintained at the desired average value.

Accordingly, the present invention allows the user to directly select the arc current. There is no need to revert to tables showing an approximate arc current-wire speed relationship. Nor is there a need to "fine tune" the current level by adjusting a wire feed speed. Moreover, variations in the physical properties of the wire will be automatically compensated for by controller 122. For example, if the wire diameter decreases, changing the current, controller 122 will detect the change in current and adjust the wire feed speed until the current returns increases the desired level. Controller 122 will be described below, but as one skilled in the art will recognize there are a myriad of ways to implement controller 122.

Figure 2:
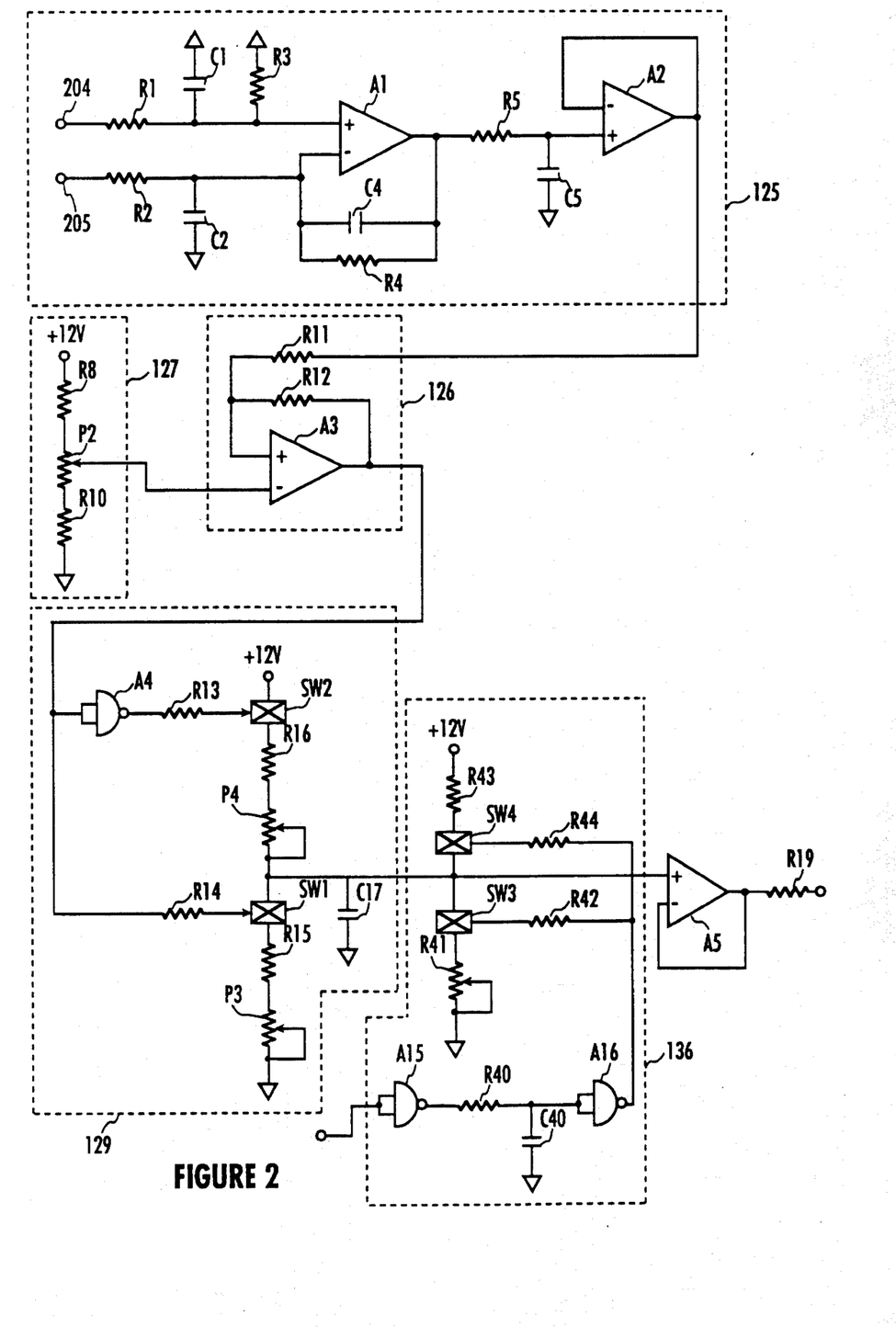
FIG. 2 is a circuit diagram of a controller used to implement several aspects of the present invention.

Referring now to FIG. 2, a circuit diagram of part of controller 122 is shown. In the preferred embodiment, current amplifier 125 includes a pair of input lines 204 and 205, a plurality of resistors R1, R2, R3, R4 and R5, a plurality of capacitors C1, C2, C4 and C5, and a pair of op amps A1 and A2.

Current amplifier 125 receives the current sensor signal on input lines 204 and 205. In one embodiment, a shunt signal is derived across a 50 mV shunt. The 50 mV drop corresponds to a current of approximately 200 amps. Input line 204 is connected to the more positive end of shunt 123 and is provided through 1,000 ohm resistor R1 to the noninverting input of op amp A1 and the 100K ohm resistor R3 to ground. For smoothing noise the 0.1 microfarad capacitor C1 is placed across 100K ohm resistor R3.

Input line 205 is connected to the more negative end of shunt 123 and the signal is applied to the inverting input of op amp A1 through 1000 ohm resistor R2. Again, for smoothing noise, 0.1 microfarad capacitor C2 is disposed between the inverting input of op amp A1 and ground. The 100K ohm feedback resistor R4 is provided from the inverting input of op amp A1 to its output to develop a gain of approximately 100. For damping, 0.001 microfarad feedback capacitor C4 is also provided across the inverting input of op amp A1 and the output of op amp A1.

The resistance and capacitances of the components associated with op amp A1 were selected to provide sufficient damping to prevent very short perturbations in the arc current from affecting the control process. On the other hand, the time constant is selected short enough to effectively control the arc spray process. In this embodiment, time constants of about 0.1 milliseconds were selected.

The output of op amp A1 is thus an amplified and slightly smoothed version of the arc current. The amplified signal is provided through 5000 ohm resistor R5 to op amp A2, which acts as a current buffer. One microfarad capacitor C5 is connected between the noninverting input of buffer A2, and ground. Amplifier A2 could alternatively be designed using different components, for example discrete devices rather than op amps, or digital rather than analog devices. The output of buffer A2 is provided as the output of current amplifier 125 to comparator 126.

Comparator 126 also receives an input from an operator set, current setpoint adjustment 127. As shown in FIG. 2, current selector setpoint 127 includes a +12 V voltage source, a resistor R8, a resistor R10 and a potentiometer P2. The output of current setpoint selector 127 is determined by the voltage divider of the resistance combination of a 3.3K ohm resistor R8, 150 ohm resistor R10 and the resistance of user adjustable potentiometer P2 (from 0 to 1,000 ohms). In accordance with the preferred embodiment, the maximum selectable current is 124 amps, which corresponds to a voltage of 3.1 V. The ratio of the output of the current setpoint selector 127 and the actual current is 25 mV per amp. In alternative embodiments other voltages could be used, as well as other means to generate the setpoint voltage, for example, digital components.

As stated above, the output of current setpoint selector 127 is provided to comparator 126. Comparator 126 includes an op amp A3 which receives at its inverting input the output of current setpoint selector 127. The noninverting input of op amp A3 receives, through a 1K ohm resistor R11, the output of current amplifier 125. A 220K ohm feedback resistor R12 is provided between the noninverting input and the output of op amp A3. Resistor R12 provides a hysteresis in the output of op amp A3 to prevent oscillation about a particular current. Thus, the output of comparator 126 changes state to a logic 1 when the actual current increases above the current setpoint plus the hysteresis induced by resistor R12. Conversely, the output of comparator 126 changes to a logic 0 when the actual current decreases below the current setpoint minus the hysteresis induced by resistor R12. As is known in the art, there are many other ways to implement comparator 126, including using digital components or other analog components.

The output of comparator 126 is provided to integrator 129 which charges or discharges a 1.0 microfarad capacitor C17, depending upon the state of comparator 126. Integrator 129 also includes an inverting NAND gate A4, a plurality of resistors R13, R14, R15, R16 and R19, a pair of analog switches SW1 and SW2, a pair of variable resistors P3 and P4 and a buffer A5. The voltage from the charge accumulated on capacitor C17 is provided as an output through buffer A5 and current limiting resistor R19. In the preferred embodiment current limiting resistor R19 has a resistance of 2K ohms. As will be explained in greater detail below, the greater the output of integrator 129 (the charge on capacitor C17), the greater the RPM of wire feed motor 103 of FIG. 1.

Capacitor C17 is selectively charged and discharged by selectively turning on one of switches SW1 or SW2. When the actual current is greater than the setpoint plus the hysteresis, the output of comparator 126 is a logical 1 and switch SW1 is turned ON through 5.6K ohm resistor R14. When switch SW1 is turned ON, a current path exists from capacitor C17 through switch SW1, 56K ohm resistor R15, and 1M ohm variable resistor P3. Thus, capacitor C17 discharges, lowering the voltage thereon, and decreasing the output of controller 122 and the speed of motor 103. As the speed of motor 103 decreases, the actual current magnitude will also decrease. Switch SW1 will remain on and the wire feed speed and arc current magnitude continue to decrease until the actual current becomes less than the setpoint minus the hysteresis.

When the actual current decreases to less than the setpoint minus the hysteresis, the output of comparator 126 changes to a logic 0. This turns off switch SW1. Also, switch SW2 is turned on because the logic 0 is inverted by NAND gate A4 and provided through 5.6K ohm resistor R13 to the gate of switch SW2. When switch SW2 is ON, capacitor C17 charges through 56K ohm resistor R16 and 1M ohm variable resistor P4. Accordingly, when the actual current is less than the current setpoint minus the hysteresis, capacitor C17 charges, increasing the voltage thereon and increasing the speed of motor 103. As the speed of motor 103 increases, the actual current will also increase. Integrator 129 was described above with respect to the preferred embodiment, but other circuitry, including other analog and digital components may be used to implement this control scheme, as well as other control schemes that also control wire feed speed in response to current magnitude.

Thus, as may be seen, a closed loop current control is disclosed. The closed loop control monitors the actual current magnitude and adjusts wire feed speed in response to the error between the desired and actual current. This control will adjust wire speed both in response to the user changing the desired current and in response to changes in operating conditions in order to attain the selected current magnitude.

Figure 3A:
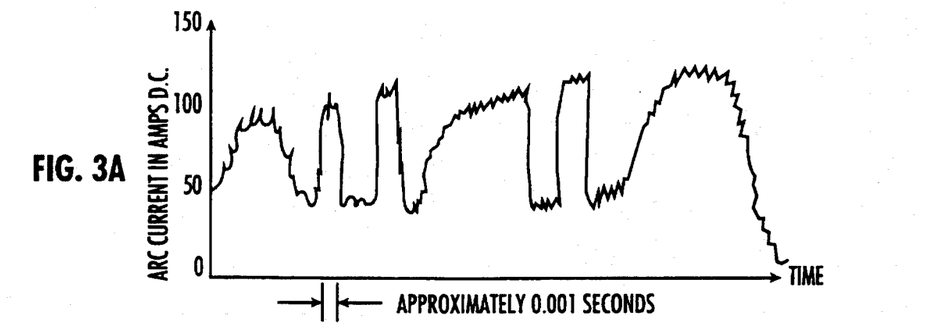
FIGS. 3A–3E show waveforms associated with the embodiment of FIG. 2.

Referring now to FIGS. 3A–3E, waveforms showing the signals present at various stages of controller 122 are shown. FIG. 3A is representative of a typical actual arc current signal as measured by shunt 123. The signal is relatively noisy and includes short term perturbations which are smoothed by the present control scheme. The actual signal may be much noisier than that shown.

Waveform 3B shows the output of amplifier 125. The output of amplifier 125 corresponds to the actual arc current of FIG. 3A but is smoothed and amplified. Also shown on FIG. 3B is the current setpoint.

Figure 3B:
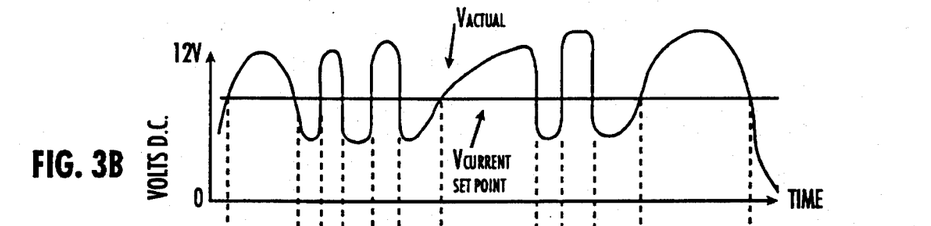
Figure 3C:
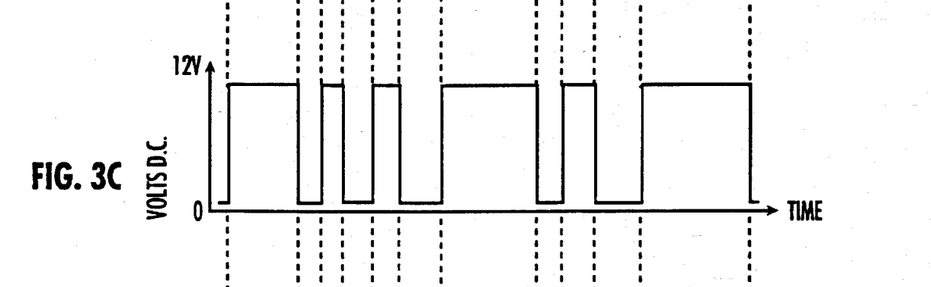

FIG. 3C shows the output of comparator 126 for the setpoint and amplified actual current of FIG. 3B. As noted above, the output of comparator 126 produces a logic 1 when the actual current is greater than the setpoint. The output of comparator 126 is a logic 0 when the actual current is less than the setpoint.

Figure 3D:
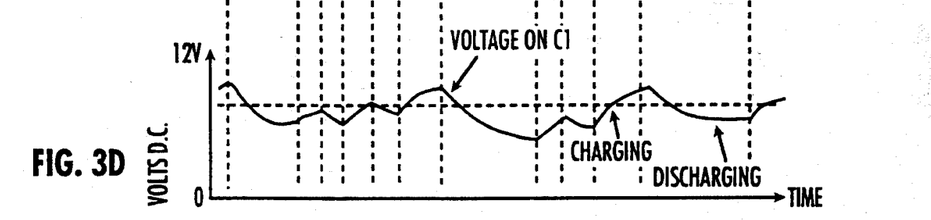

FIG. 3D shows the output of integrator 129 for the output of comparator 126 shown in FIG. 3C. As may be seen, when the actual current is greater than the setpoint current, the output of the integrator decreases. Also, when the actual current is less than the setpoint, the output of integrator 129 increases.

Figure 3E:
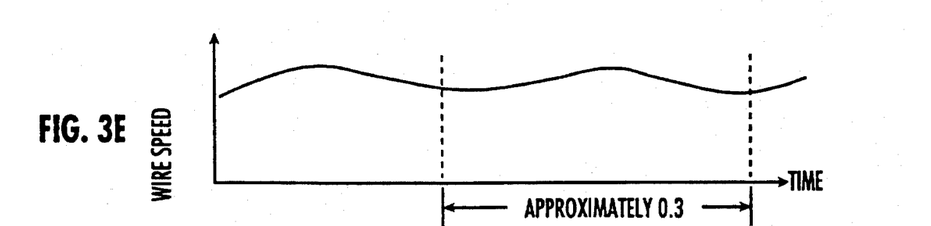

FIG. 3E shows a typical wire speed subject to the control of the present invention. As may be seen, the control varies over a length of time ranging from 0.3 seconds to 1.0 second, depending upon the condition of wire being fed and the type of wire being fed.

According to another aspect of the present invention, the controller includes circuitry to detect an arc outage or wire shortage. In the event the controller detects the presence of either of these two conditions, an indication as to the condition present is made to the user by illuminating an LED on the operating panel.

Referring back to FIG. 1 controller 122 includes components for detecting the presence of wire shortages or arc outages. Specifically, a peak detector 132 and a valley detector 134 each receive as an input the output of amplifier 125, the smoothed and amplified arc current signal. Peak detector 132 detects the presence of wire shorts by monitoring the actual current magnitude for peaks. The presence of a peak indicates the wires have shorted. When a peak is detected an LED on the panel is illuminated, thereby notifying the user that a wire shortage exists. In a similar manner valley detector 132 detects the presence of an arc outage by monitoring the actual current magnitude for valleys. The presence of a valley indicates the arc has been extinguished. When a valley is detected an LED on the panel is illuminated, thereby notifying the user that an arc outage exists.

Figure 4:
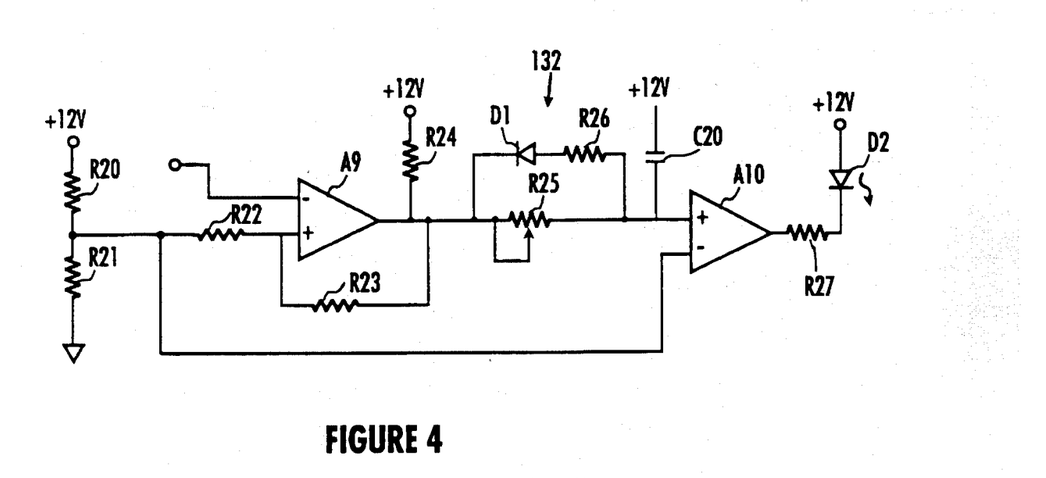
FIG. 4 is a circuit diagram of a peak detector used to implement one aspect of the present invention.

Referring now to FIG. 4, a circuit diagram of peak detector 132 is shown. Peak detector 132 includes a plurality of resistors R20, R21, R22, R23, R24, R25, R26, and R27, a pair of op amps A9 and A10, a diode D1, a capacitor C20, and an LED D2. Generally speaking, op amps A9 and A10 are configured to be comparators. When the actual current rises to a peak, op amp A9 outputs a logic 0. This causes op amp A10 to also output a logic zero, turning on LED D2.

In particular, 10K ohm resistor R20 and 33K ohm resistor R21 form a voltage divider to divide a +12 V reference source to a reference voltage of approximately 9.2 V. Op amp A9 receives the 9.2 V reference signal through 20K ohm input resistor R22 on its noninverting input. Op amp A9 also receives the actual current signal on its inverting input. Op amp A9 detects a peak, and provides an output of logic 0, when the actual current signal is greater than the reference signal. As scaled, the 9.2 volt reference signal corresponds to an arc current of 198 amps. The 56K ohm feedback resistor R23 provides hysteresis so that the output of op amp A9 returns to a logic 1 after the arc current decreases to less than 139 amps.

When the output of op amp A9 is logic 0, capacitor C20 is charged very rapidly via diode D1 and 610 ohm resistor R26, lowering the voltage at the noninverting input of op amp A10. When the voltage applied to the noninverting input decreases past 9.2 volts, the output of op amp A10 goes to near zero volts. This turns on LED D2 through 2K ohm resistor R27, indicating a wire shortage exists.

However, the time span of wire shortages is often so short that it would be difficult for a user to see LED D2 being illuminated, therefore capacitor C20 has a slower discharge rate than charge rate. When the arc is reestablished and the arc current decreases below 139 amps, output of op amp A9 returns to "1" and capacitor C20 begins discharging. The discharge path includes only 200K ohm variable resistor R25 because diode D1 blocks resistor R26. Thus, the LED will remain on for an additional 0.1 seconds. This on time is generally long enough for the human eye to see the LED on.

Figure 5:
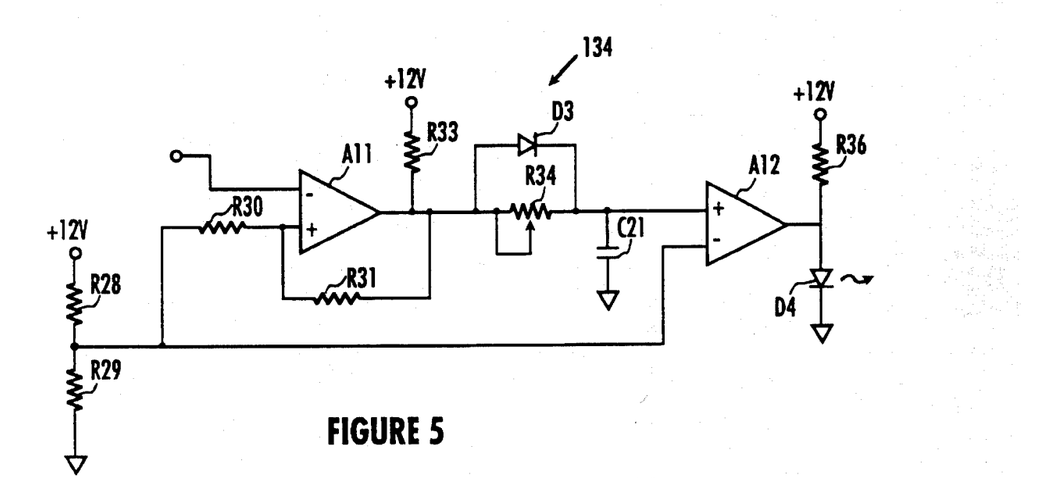
FIG. 5 is a circuit diagram of a valley detector used to implement one aspect of the present invention.

Valley detector 134 operates in a similar manner, except the logic is reversed because valleys are being detected. Referring now to FIG. 5, valley detector 132 includes a plurality of resistors R28, R29, R30, R31, R33, R34 and R36, a pair of op amps A11 and A12, a diode D3, a capacitor C21, and an LED D4. Op amps A11 and A12 are configured to be comparators. When the actual current decreases to a valley, op amp A11 outputs a logic 1. This causes op amp A12 to also output a logic 1, turning on LED D4.

In particular, 1.2K ohm resistor R29 and 22K ohm resistor R28 form a voltage divider to divide a +12 V reference source to a reference voltage of approximately 0.6 V. Op amp A11 receives the 0.6 V reference signal through 33K ohm input resistor R30 on its noninverting input. Op amp A11 also receives the actual current signal on its inverting input. Op amp A11 detects a valley, and provides an output of logic 1, when the actual current signal is less than the reference signal. As scaled, the 0.6 volt reference signal corresponds to an arc current of 11 amps. 240K ohm feedback resistor R31 provides hysteresis so that the output of op amp A11 returns to a logic 0 when the arc current increases to more than 39 amps.

When the output of op amp A11 is logic 1, capacitor C21 is charged very rapidly via diode D3 and resistor R33, 12K ohm, increasing the voltage at the noninverting input of op amp A12. When the voltage increases past 0.6 volts, which is applied to the inverting input, the output of op amp A12 goes to a logic 1. This turns on LED D4 through 2K ohm resistor R36, indicating an arc outage exists. As with respect to the peak detector, the on time of LED D4 is stretched by using 200K ohm resistor R34 in the discharge path of capacitor C21.

Thus, peak detector 132 and valley detector 134 detect the presence of wire shorts and arc outages, respectively. Moreover, they provide for indicators to be lit so that the user may adjust the operating parameters and/or learn the characteristic sound of such conditions. Of course, the outage and shortage detection could be performed using other circuitry, including analog and digital devices.

Another feature of the present invention relates to the start conditions of arc spraying. More specifically, at times it may be desirable to operate at or near voltage and currents that are likely to cause wire shortages and arc outages. While ongoing operation in these regions is possible, it is difficult to start the arc spraying process under such conditions. A soft start circuit 136 that forces the initial arc current to be at a more easily starting value is shown in block form on FIG. 1.

Soft start circuit 136 is connected, along with integrator 129, to the output of controller 122 that determines the wire feed motor speed. When the user begins the arc spraying process by initially squeezing a trigger on gun 116, soft start circuit 136 temporarily clamps the output of controller 122 and the wire feed motor speed, at a level where operation and start up is easier. After an initialization period the clamp is released and integrator 129 controls the current and wire feed speed levels.

Referring now to FIG. 2, soft arc circuit 136 is shown schematically and includes a plurality of resistors R40, R41, R42, R43 and R44, a pair of NAND gates A15 and A16, a capacitor C40 and a pair of switches SW3 and SW4.

The input of NAND gate A15 is connected to the trigger of gun 116. When the trigger is not being pulled, i.e. the machine is on but not being used, the input to NAND gate A15 is a logic 1. Under this condition the output of NAND gate A15 is a logic 0, which is applied to the input of NAND gate A16. Thus, the output NAND gate A16 is a logic 1. The logic 1 is applied to the gates of switches SW3 and SW4 through 2K ohm resistors R42 and R44, turning on switches SW3 and SW4. This causes the voltage divider comprised of a +12 V voltage source, 10K ohm resistor R43 and variable resistor (0–10K ohm) R41 to be connected across capacitor C17 (of integrator 129), thereby clamping the voltage on capacitor C17 and the output of controller 122 at the voltage divider level. The voltage divider is selected to provide a voltage corresponding to a current in the middle of the operating range, and not near arc outage or wire shortage regions.

When the operator pulls the trigger of gun 116, the input to NAND gate A15 goes low, causing the output to go high. The input to NAND gate A16 will remain low until 4.7 microfarad capacitor C40 is charged through 22K ohm resistor R40. In this embodiment that takes approximately 0.1 seconds, although in other embodiments it may be different. During this delay the wire feeder advances the wire to the arc at the rate set by the voltage divider.

After the delay the output of NAND gate A16 goes low, turning off switches SW3 and SW4. This allows the integrator to control the speed of the wire feed motor in accordance with the closed loop control described above. Thus, an initializing circuit is provided that allows for easy starting of the arc spray process, regardless of the settings the user selected. Of course, the soft start could be performed using other circuitry, including other analog and digital devices.

Thus, it should be apparent that there has been provided in accordance with the present invention a method and apparatus for initiating electric arc spraying that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A method of initiating arc spraying process between a plurality of wires comprising:
   feeding the wires to an intersection point at a predetermined rate for a period of time, prior to current flowing through the wires;
   automatically adjusting the speed at which the wires are fed to a different rate after the wires have contacted one another;
   providing electrical current to the wires after the wires have contacted one another and forming an arc between the wires by melting portions of the wires; and
   providing a gas to the arc.

2. The method of claim 1 wherein the period of time is approximately 0.1 seconds.

3. The method of claim 1 wherein the step of feeding the wires at a different rate includes the steps of monitoring the magnitude of a parameter delivered to the arc and controlling the rate of feeding wire in response to the parameter.

4. An arc sprayer for electric arc spraying a plurality of wires comprising:
   a wire feeder including at least one feed motor operable to drive the wires;
   at least one power source operable to provide current to the wires;
   a controller, operatively connected to the power source and the feed motor, the controller including a first wire feed speed output, wherein the controller provides the first wire feed speed output for a period of time prior to the wires coming into contact with one another and further wherein an arc is formed after the wires have contacted and wherein the speed of the feed motor is responsive to a second wire speed output.

5. The arc sprayer of claim 4 wherein the controller includes a trigger sensor that initiates the period of time when the arc spray process is initiated.

6. The arc sprayer of claim 5 wherein the controller further comprises an arc parameter sensor and a closed loop control circuit operatively connected to the sensor, wherein the speed of the feed motor after the length of time is responsive to the closed loop control circuit.

7. The arc sprayer of claim 6 wherein the controller further comprises an arc outage detection circuit operatively connected to the sensor, and having an output indicative of the presence or absence of the arc.

8. The arc sprayer of claim 6 wherein the controller further comprises a wire shortage detection circuit operatively connected to the sensor, and having an output indicative of the presence or absence of an arc shortage.

9. The arc sprayer of claim 6 further comprising a source of gas disposed to direct gas to the arc.

10. A controller for an arc sprayer including a wire feed motor and a power source, the controller comprising:
    a wire feed speed output;
    a predetermined wire speed output;
    a circuit for connecting the predetermined wire speed output to the wire feed motor for a period of time prior to the providing of current to the wires, and for connecting the wire feed speed output to the wire feed motor after the predetermined length of time.

11. The arc sprayer of claim 10 including a time delay circuit having means for beginning the time delay when the arc spray process is initiated.

12. The arc sprayer of claim 10 further comprising:
    a sensor disposed to sense a parameter of the arc, the sensor capable of providing an output indicative of the arc;
    a setpoint selector having an output indicative of a setpoint;
    a comparator having as inputs the outputs indicative of the arc and the setpoint, whereby the comparator has as an output a signal indicative of the relative magnitude of the input signals; and
    a signal generator disposed to receive the output of the comparator as an input and the wire feed speed output.

13. The controller of claim 11 further comprising an arc outage detection circuit operatively connected to the current sensor, and having an output indicative of the presence or absence of the arc.

14. The controller of claim 11 further comprising a wire shortage detection circuit operatively connected to the sensor, and having an output indicative of the presence or absence of an arc shortage.

15. An arc sprayer for arc spraying a plurality of wires comprising:
    a wire feeder, including a variable speed motor for feeding the wires to an arc at a controllable rate;
    a power source for providing electrical current to the arc through the wires;
    a sensor disposed to sense a parameter of the arc; and
    means for feeding the wires at a predetermined rate for a period of time prior to the providing of current to the wires and subsequently forming an arc between the wires and feeding the wires at a different rate.

16. The arc sprayer of claim 15 wherein the means for feeding further includes means for feeding the wires at the predetermined rate when the arc spray process is initiated.

17. The arc sprayer of claim 15 wherein the means for subsequently feeding includes means for subsequently controlling the rate of feeding in response to the magnitude of the arc current.

18. The arc sprayer of claim 17 further comprising means for detecting the presence or absence of the arc and providing an output indicative of the presence or absence of the arc.

19. The arc sprayer of claim 17 comprising means for detecting the presence or absence of an arc shortage and providing an output indicative of the presence or absence of an arc shortage.

* * * * *